J. ROHRER.
DEVICE FOR SOLDERING BAND SAWS.
APPLICATION FILED DEC. 16, 1909.

988,820.

Patented Apr. 4, 1911.

UNITED STATES PATENT OFFICE.

JAKOB ROHRER, OF MURI, NEAR BERNE, SWITZERLAND.

DEVICE FOR SOLDERING BAND-SAWS.

988,820. Specification of Letters Patent. Patented Apr. 4, 1911.

Application filed December 16, 1909. Serial No. 533,341.

*To all whom it may concern:*

Be it known that I, JAKOB ROHRER, a citizen of the Swiss Republic, and resident of Muri, near Berne, Switzerland, have invented certain new and useful Improvements in Devices for Soldering Band-Saws, of which the following is a specification.

This invention relates to a device for soldering band saws its object being to provide a device of this kind which comprises two superposed clamping jaws of which the upper one is movable with reference to the lower one and which are arranged in such a manner that they are able to clamp together, during the soldering operation, the ends which it is desired to solder together.

The clamping jaws proper are formed of non metallic material which is a bad conductor of heat and fire proof and are shaped in such a manner that they cover as little as possible the soldering seam and are heated at the same time as the said soldering seam. When the clamping jaws are tightened, the soldering seams are not cooled, but the soldering material is uniformly distributed over the entire surface to be soldered and the soldering material (solder) which eventually would be introduced between the soldering seams is pressed out so that only that amount of soldering material is left between the surfaces to be soldered as is really necessary for obtaining the connection. By using a non metallic fireproof material, a uniform and intensive heating of the soldering seam is obtained and the adhering of the soldering mass to the clamping jaws is avoided. This device has this advantage that the soldering seams become much tougher and consequently last much longer than when the soldering is carried out by hand or by means of other apparatuses.

Figure 1:
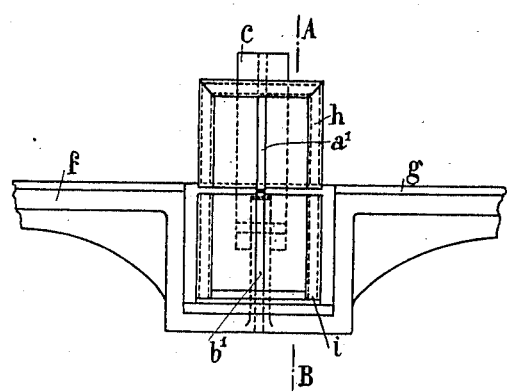
Figure 2:
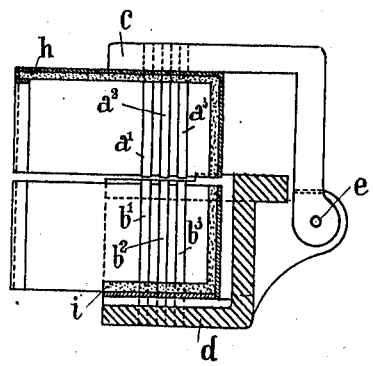

In the accompanying drawings given by way of example, Figure 1 shows one form of embodiment of the device for soldering band saws, which forms the subject matter of this invention. Fig. 2 is a section on line A—B of Fig. 1.

$a'$, $a^2$, $a^3$ and $b'$, $b^2$, $b^3$ designate respectively three pins made of non metallic fire proof material preferably porcelain, between the opposite ends of which the ends of the band saw which it is desired to solder together are clamped. The pins are secured in two iron members $c$ and $d$ respectively, which are shaped so as to be adapted to receive the said pins. The lower member is stationary while the upper one is hingedly secured by means of the hinge $e$ with the lower one so that the clamping effect is produced by the pressure exerted on the upper member. The intervals left between the said pins, leave sufficient free space for the soldering joint so that the latter can be well obtained and acted upon by the soldering flame. The lower part $d$ is provided with arms $f$ and $g$ projecting freely in opposite directions and which are adapted to carry and guide the band saw.

Secured to each of the parts $c$ and $d$ is a cap $h$ and $i$ respectively provided on the inner side with a poor heat conducting material such as for instance asbestos, the said caps inclosing the space surrounding the soldering joint, but leaving free an opening for introducing the soldering flame so that the heat of the latter is held together as much as possible and is concentrated on the soldering joint.

The above described soldering device is employed in the following manner. The blade of the hand saw which it is desired to solder is for instance chamfered on one side at each of its ends and the surfaces produced by the chamfering operation are applied upon each other and the solder is introduced between them while the blade of the saw rests on the lower clamping member. When the upper clamping member is applied on the ends of the saw blade, the said ends are held at the soldering joint so that the soldering operation can be carried out in a sure and commodious manner.

I claim:

1. In a device for soldering band saws, the combination of two clamping members, one of the clamping members movably connected to the other, pins made of poor heat conducting material secured in each of said members, the pins of each member being oppositely disposed to the pins of the other member and adapted to form clamping jaws for securing the ends of the saw-blade, and a cap fastened to each of said clamping members surrounding said pins.

2. In a device for soldering band saws, the combination of a lower stationary clamping member, an upper clamping member hingedly connected to the stationary member, pins made of poor heat conducting material secured in each of said members, the pins of each member being arranged in rows and the pins of the upper member being oppositely disposed to those of the stationary member and adapted to form clamping jaws for securing the ends of the saw-blade, a cap fastened to each of said clamping members surrounding each row of pins to concentrate the heat of the soldering flame and each cap being lined on the inside with a poor heat conducting material.

In testimony whereof I have hereunto set my hand in presence of two witnesses.

JAKOB ROHRER.

Witnesses:
GEORGE GIFFORD,
HENRI ZANDT.

Copies of this patent may be obtained for five cents each, by addressing the "Commissioner of Patents, Washington, D. C."